United States Patent [19]

Shimizu et al.

[11] Patent Number: 5,399,613
[45] Date of Patent: Mar. 21, 1995

[54] POLYMER SCALE PREVENTIVE AGENT, POLYMERIZATION VESSEL EFFECTIVE IN PREVENTING POLYMER SCALE DEPOSITION, AND PROCESS OF PRODUCING POLYMER USING SAID VESSEL

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 281,136

[22] Filed: Jul. 27, 1994

Related U.S. Application Data

[63] Continuation of Ser. No. 950,128, Sep. 24, 1992, abandoned.

[30] Foreign Application Priority Data

Sep. 24, 1991 [JP]  Japan .................................. 3-271944
Sep. 24, 1991 [JP]  Japan .................................. 3-271945

[51] Int. Cl.$^6$ .......................... C08K 5/15; C08L 51/08
[52] U.S. Cl. .................................. 524/540; 524/236; 524/500; 524/541; 524/542; 526/62
[58] Field of Search .......................... 564/155; 526/62; 524/500, 540, 541, 542, 236

[56] References Cited

U.S. PATENT DOCUMENTS

| | | | |
|---|---|---|---|
| 4,044,139 | 8/1977 | von Schmeling et al. | 564/155 |
| 4,355,141 | 10/1982 | Okada et al. | 526/62 |
| 4,841,009 | 6/1989 | Kelsey | 564/155 |
| 5,130,481 | 7/1992 | Khanna et al. | 564/155 |

FOREIGN PATENT DOCUMENTS

| | | |
|---|---|---|
| 42725 | 12/1981 | European Pat. Off. |
| 0042725 | 12/1981 | European Pat. Off. |
| 4530343 | of 1960 | Japan |
| 57-155201 | of 1982 | Japan |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising a condensation product of:
  (A) an aromatic amine compound, and
  (B) an aromatic hydroxyl compound condensate.

This agent is used for forming a coating on the inner wall, etc. of a polymerization vessel. Such a vessel is effective in preventing polymer scale deposition and useful in producing a polymer that shows very few fish eyes and good whiteness when formed into sheets or the like.

9 Claims, No Drawings

POLYMER SCALE PREVENTIVE AGENT, POLYMERIZATION VESSEL EFFECTIVE IN PREVENTING POLYMER SCALE DEPOSITION, AND PROCESS OF PRODUCING POLYMER USING SAID VESSEL

This application is a continuation of application Ser. No. 07/950,128, filed on Sep. 24, 1992, now abandoned.

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, are known suspension polymerization, emulsion polymerization, solution polymerization, gas phase polymerization and bulk polymerization. In any type of the polymerizations, polymer scale is liable to be deposited on the areas with which the monomer come into contact during polymerization, such as inner walls, stirring equipment and so on of a polymerization vessel.

The deposition of the polymer scale on the inner wall results in disadvantages that the yield of the polymer and cooling capacity of the polymerization vessel are lowered; that the polymer scale may peel and mix into a polymeric product, thereby impairing the quality of thereof; and that removal of such polymer scale is laborious and hence time-consuming. Further, since the polymer scale contains unreacted monomers and operators may be exposed thereto, which may cause physical disorders in the operators.

Heretofore, as a method for preventing polymer scale deposition on the inner wall and so forth, methods by which a polymer scale preventive agent comprising an amine compound, quinone compound, aldehyde compound or the like is coated on the inner wall, etc. of a polymerization vessel or methods by which such compounds are added to an aqueous medium for polymerization (Japanese Patent Publication (KOKOKU) No. 45-30343 (1960)).

These methods can prevent the deposition of polymer scale if polymerization run is repeated within about 5 or 6 times; however, the number of repetition of polymerization run exceeds 5 or 6, the scale preventive effect is weakened. That is, the scale preventive effect is poor in durability. Particularly, the scale preventive effect is adversely affected where a water-soluble catalyst is used and unsatisfactory industrially.

It is proposed in Japanese Pre-examination Patent Publication (KOKAI) No. 57-155201 (1982) to form a coating of a condensation product of an aromatic amine compound on the areas with which monomers comes into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel.

However, polymer scale deposition is liable to occur in the vicinity of the interface between the gas phase and the liquid phase which is located at the upper section of a polymerization vessel. Once polymer scale is deposited in the vicinity of the interface between the gas phase and the liquid phase, the deposited scale will grow gradually as polymerization runs are repeated, and at last it is peeled from the inner wall, etc. and incorporated into the polymeric product. If the polymeric product containing the polymer scale is processed into formed products such as sheets or the like, the polymer scale causes increase in fish eyes in the formed products, lowering seriously the quality thereof.

Polymeric products obtained by polymerization are required to have a high whiteness. That is, when a polymeric product is formed into a sheet or the like without any addition of a coloring agent, the resulting formed product is more or less colored. Such coloration is called initial coloration, which is desired to be as low as possible. However, the coating comprising Said condensation product of an aromatic amine compound disclosed in the Japanese Pre-examination Publication may be peeled or dissolved into a polymeric product, thereby lowering the whiteness or increasing the initial coloration thereof.

SUMMARY OF THE INVENTION

It is accordingly an object of the present invention to provide a polymer scale preventive agent that can prevent effectively the deposition of polymer scale not only in the areas in the liquid phase but also in the vicinity of the interface between the gas and liquid phases, and can produce polymeric products with a very small number of fish eyes and low initial coloration after processed into formed products such as sheets or the like in polymerizing a monomer having an ethylenically unsaturated double bond, a polymerization vessel using the same, and a process of producing a polymer using the vessel.

Thus, the present invention provides, as a means of achieving the above object, a polymer scale preventive agent for use in polymerization of a monomer having an ethylenically unsaturated double bond, comprising a condensation product of:

(A) an aromatic amine compound, and (B) an aromatic hydroxyl compound condensate.

The present invention also provides a polymerization vessel for use in polymerization of a monomer having an ethylenically unsaturated double bond, having on its inner wall surfaces a polymer scale preventive coating, wherein said coating comprises a condensation product of:

(A) an aromatic amine compound, and (B) an aromatic hydroxyl compound condensate.

Further, the present invention provides a process of producing a polymer of an ethylenically unsaturated double bond, which comprises polymerizing the monomer in a polymerization vessel having a polymer scale preventive coating on its inner wall surfaces, wherein said coating comprises a condensation product of:

(A) an aromatic amine compound, and (B) an aromatic hydroxyl compound condensate.

According to the present invention, deposition of polymer scale can be effectively prevented not only on the areas in the liquid phase but also in the vicinity of the interface between the gas and liquid phases in a polymerization vessel. Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes and high whiteness or low initial coloration. That is, the formed products exhibit a luminosity index L in the Hunter's color difference equation described in JIS Z 8730(1980) of 70 or more in the case of vinyl chloride polymers and 80 or more in the case of SBR, for instance.

DETAILED DESCRIPTION OF PREFERRED EMBODIMENTS (A) Aromatic amine compound

The aromatic amine compound (A) is represented, for example, by the general formulas (1), (2) and (3):

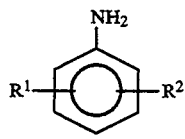
(1)

wherein $R^1$ stands for —H, —$NH_2$, —Cl, —OH, —$NO_2$, —$COCH_3$, —$OCH_3$, —$N(CH_3)_2$ or an alkyl group having 1 to 3 carbon atoms, and $R^2$ stands for —H, —$NH_2$, —OH, —$CH_3$, —COOH or —$SO_3H$.

Specifically, the compounds of the general formula (1) include, for example, aniline, o-, m- or p-phenylenediamine, o-, m- or p-aminophenol, o-, m- or p-chloroaniline, o-, m- or p-nitroaniline, o-, m- or p-methylaniline, N,N-dimethylparaphenylenediamine, 4-chloro-o-phenylenediamine, 4-methoxy-o-phenylenediamine, 2-amino-4-chlorophenol, 2,3-diaminotoluene, 5-nitro-2-aminophenol, 2-nitro-4-aminophenol, 4-nitro-2-aminophenol, o-, m- or p-aminosalicylic acid, o-, m- or p-aminobenzoic acid, 2,4- or 3,5-diaminobenzoic acid, o-, m- or p-aminobenzenesulfonic acid, 2,4-diaminobenzenesulfonic acid and the like. Among these compounds, preferred are o-,m- or p-aminophenol, aniline, 4-methoxy-o-phenylenediamine, 5-nitro-2-aminophenol, 2-nitro-4-aminophenol, o-, m- or p-aminosalicylic acid, p-aminobenzenesulfonic acid and 2,4-diaminobenzenesulfonic acid.

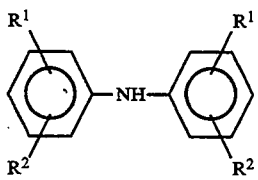
(2)

wherein the two $R^1$ may be the same or different and are each as defined above, and the two $R^2$ may be the same or different and are each as defined above.

Specifically, the compounds of the general formula (2) include, for example, diphenylamines such as 4-aminodiphenylamine, 2-aminodiphenylamine, 4,4'-diaminodiphenylamine 4-amino-3'-methoxydiphenylamine, 4-amino-4'-hydroxydiphenylamine and the like. Among the compounds, preferred are 4-aminodiphenylamine, 2-aminodiphenylamine and 4,4'-diaminodiphenylamine.

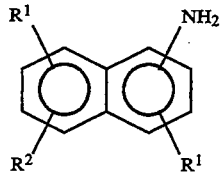
(3)

wherein the two $R^1$ may be the same or different and are each as defined above, and $R^2$ is as defined above.

Specifically, the compounds of the general formula (3) include, for example, α-naphthylamine, β-naphthylamine, 1,5-diaminonaphthalene, 1-amino-5-hydroxynaphthalene, 1,8-diaminonaphthalene, 2,3-diaminonaphthalene and the like. Among these compounds, preferred are α-naphthylamine, 1,5-diaminonaphthalene and 1,8-diaminonaphthalene.

(B) Aromatic hydroxyl compound condensate

The aromatic hydroxyl compound condensate, the component (B) constituting the condensation product of the present invention, is a condensation product essentially comprising an aromatic hydroxyl compound as a condensation reactant, and includes, for example, condensation products of an aromatic hydroxyl compound only, condensation products of an aromatic hydroxyl compound with other compounds such as, for example, acetone, aldehydes and aromatic amine compounds, and natural aromatic hydroxyl-containing organic compounds.

The aromatic hydroxyl compound essentially contained in the component (B) as a condensation reactant includes, for example, the compounds having the general formulas (4) and (5):

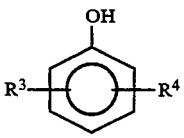
(4)

wherein $R^3$ stands for —H, —Cl, —OH, —$COCH_3$, —$OCH_3$, —COOH, —$SO_3H$ or an alkyl group having 1 to 3 carbon atoms, and $R^4$ stands for —H, —Cl, —OH, —$OCH_3$, —$OC_2H_5$ or —COOH.

Specifically, the compounds of the general formula (4) include, for example, phenols such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid, 2,5-, 2,6- or 3,5-dihydroxytoluene and the like.

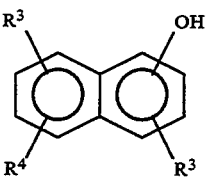
(5)

wherein the two $R^3$ may be the same or different and are each as defined above, and $R^4$ is as defined above.

Specifically, the compounds of the general formula (5) include, for example, naphthols end their derivatives such as α-naphthol, β-naphthol, 1,3-, 1,4-, 1,5-, 2,3-, 2,6- or 2,7-dihydroxynaphthalene, 1-hydroxy-2-naphthoic acid, 3-hydroxy-2-naphthoic acid and the like.

(I) Aromatic hydroxyl compound-acetone condensate

All of the condensation products of acetone with any of the aromatic hydroxyl compounds described above, can be used. Typical examples of the condensates include pyrogallol-acetone condensates, resorcinol-acetone condensates, 2,7-dihydroxynaphthalene-acetone condensates, 1,5-dihydroxynaphthalene-acetone condensates, 2,6-dihydroxynaphthalene-acetone condensates, 2,3-dihydorxynaphthalene-acetone condensates, 2-hydroxynaphthoquinone-acetone condensates, alizarinacetone condensates and the like.

The condensates above can be obtained by dissolving an aromatic hydroxyl compound in acetone, and reacting them in the presence of a catalyst at a temperature of about room temperature to 100° C. As the catalyst, phosphorus oxychloride is used, for instance.

(II) aromatic hydroxyl compound-aldehyde condensate

The aldehyde used as one of the reactants includes, for example, formaldehyde, acetaldehyde, glyoxal, glutaric aldehyde, benzaldehyde and the like.

All of the condensates of any of the aromatic hydroxyl compound with any of the aldehydes above can be used. Typical examples of the condensates include the condensates of formaldehyde with phenol, hydroquinone, catechol, pyrogallol, 2,7-dihydroxynaphthalene,-1,5-dihydroxynaphthalene, 2,3-dihydroxynaphthalene, alizarin, anthraflavic acid, or 1,4,5,8-tetrahydroxynaphthalene, pyrogallol-benzaldehyde condensates, phenol-benzaldehyde condensates, 2,3-dihydroxynaphthalene-benzaldehyde condensates, catechol-benzaldehyde condensates, anthraflavic acid-benzaldehyde condensates, 2,7-dihydroxynaphthalenebenzaldehyde condensates, 1,4,5,8-tetrahydroxynaphthalenebenzaldehyde condensates, 1,5-dihydroxynaphthalenebenzaldehyde condensates, 1,5-dihydoroxynaphthlene benzaldehyde condensates and the like.

The condensate can be obtained by reacting an aromatic hydroxyl compound and an aldehyde in the presence of a catalyst in an aqueous or alcoholic solvent around room temperature to about 200° C. The catalyst includes, for example, acidic substances such as phosphoric acid and hydrochloric acid, and alkaline substances such as sodium hydroxide, potassium hydroxide and ammonia.

(III) Condensates of aromatic hydroxyl compound alone

Any of the aromatic hydroxyl compounds exemplified above can form condensates through condensation reaction. Typical examples include the condensates of pyrogallol, resorcinol, catechol, 2,7-dihydroxynaphthalene, or 2-hydroxynaphthoquinone.

The condensate can be obtained by reacting an aromatic hydroxyl compound in the presence of a catalyst such as a peroxide, azo compound, nitro compound, halogen compound, quinone or metallic salt at a temperature of about room temperature to 200° C. in water, an organic solvent such as alcohols, ketones, and esters, or a mixed solvent of water and an organic solvent mentioned above. Specifically, the catalyst used includes, for example, peroxides such as periodic acid, potassium periodate and hydrogen peroxide, azo compounds such as α, α'-azobisisobutyronitrile, metallic salts such as ferric chloride, aromatic nitro compounds such as nitrobenzene, and aromatic quinone compounds such as p-benzoquinone.

(IV) Aromatic hydroxyl compound—aromatic amine compound condensates

The aromatic amine compound which is used as one of the reactants for the condensate, is exemplified by those described as the component (A) above.

The combination of an aromatic hydroxyl compound and an aromatic amine compound is not particularly limited. Typical examples include pyrogallol-p-phenylenediamine condensates, resorcinol-m-phenylene condensates, pyrogallol-1,8-diaminonaphthalene condensates, catechol-1,8-diaminonaphthalene condensates, 2,7-dihydroxynaphthalene-p-aminophenol condensates, 4-aminodiphenylamine-pyrogallol condensates, and 2,3-dihydroxynaphthalene-1,5-diaminonaphthalene condensates.

The condensate can be obtained by reacting an aromatic hydroxyl compound and an aromatic amine compound at a temperature of about room temperature to about 200° C. in the presence of a catalyst in water, an organic solvent such as alcohols, ketones and esters, or a mixed solvent of water and an organic solvent mentioned above. The catalyst used includes, for example, peroxides such as periodic acid, potassium periodate and hydrogen peroxide, azo compounds such as α,α'-azobisisobutyronitrile, metallic salts such as ferric chloride, aromatic nitro compounds such as nitrobenzene, and aromatic quinone compounds such as p-benzoquinone.

(V) Natural aromatic hydroxyl-containing organic compound

The natural aromatic hydroxyl-containing organic compounds include, for example, Chinese gallotannin, sumac tannin, tara tannin, valonia tannin, chestnut tannin, myrobalan tannin, oak tannin, divi-divi tannin, algarobillatannin, gambier tannin, quebrachotannin, wattle tannin, mimosa tannin, mangrove tannin, hemlock tannin, spruce tannin, Burma cutch tannin, oak bark tannin, tannin of persimmon, curcumin, urushiol, lignin, sodium lignin sulfonate, alkali lignin and the like.

Among the aromatic hydroxyl compound condensates above, preferred are pyrogallol-acetone condensates, 2,7-dihydroxynaphthalene-acetone condensates, 2,3-dihydroxynaphthalene-acetone condensates, resorcinolacetone condensates, 2,7-dihydroxynaphthalene-benzaldehyde condensates, 2,3-dihydroxynaphthalene-formaldehyde condensates, 1,4,5,8-tetrahydroxynaphthalene-benzaldehyde condensates, pyrogallol-formaldehyde condensates, 2,7-dihydroxynaphthalene condensates, pyrogallol condensates, 2,7-dihydroxynaphthalene-p-aminophenol condensates, catechol-4-aminodiphenylamine condensates, pyrogallol-1,8-diaminonaphthalene condensates, nutgalls tannin, wattle tannin, mimosa tannin, oak tannin, Chinese gallotannin, quebrachotannin, chestnut tannin, tannin of persimmon, mangrove tannin and tannins.

Preparation of the condensation product of the component (A) and the component (B)

The condensation product of the aromatic amine compound (A) and the aromatic hydroxyl compound condensate (B), which is the effective component of the present polymer scale preventive agent, can be prepared by reacting the components (A) and (B) in the presence of a suitable catalyst at a temperature of room temperature to about 200° C. in a suitable medium for about 0.5 to 150 hours.

As the medium for reaction, preferred are organic solvents such as, e.g., alcohols, ketones and esters, and mixed solvents of water and an organic solvent compatible with water. The organic solvents compatible with water include, for example, alcohols such as methanol, ethanol and propanol, ketones such as acetone, methyl ethyl ketone, and the like, and esters such as methyl acetate and ethyl acetate.

The catalyst suitable for the reaction includes, for example, oxyacids or salts thereof such as iodic acid, periodic acid, potassium periodate and sodium perchlorate, peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide, azo compounds such as $\alpha,\alpha'$-azobisisobutyronitrile and $\alpha,\alpha'$-azobis-2,4-dimethylvaleronitrile, and metallic salts such as ferrous oxide, ferric oxide, copper (I) oxide, and ferric chloride.

Although the addition of the component (B) to a reaction solution containing the component (A) may be begun at the start of the condensation reaction, it is preferred that the condensation reaction of the component (A) alone is first carried out and thereafter the component (B) begins to be added. More preferably, the component (B) is added to the reaction mixture just before a condensation product of the component (A) precipitates, that is, at the time when the condensation conversion of the component (A) reaches the range of 50 to 99% by weight, particularly in the range of 70 to 95% by weight, although the desirable time depends on the kind of the component (A), reaction rate, etc. After the completion of the addition of the component (B), reaction is normally continued for from 2 to 50 hours.

Condensation conversion of the component (A) herein means the amount in % by weight of the component (A) consumed for condensation based on the total amount of the component (A) charged as a monomer. That is, condensation conversion is defined by the equation:

Condensation conversion (% by weight) = $[(a-b)/a] \times 100$ wherein a stands for the total amount in part(s) by weight of the component (A) charged as a monomer, and b stands for the amount in part(s) by weight of the unreacted component (A).

It normally takes 0.2 to 100 hours for the condensation conversion of the component (A) to reach 50 to 99% by weight, although the time depends on the kind of the component (A), etc.

Although the amounts of the components (A) and (B) subjected to the condensation reaction depends on the kinds of the components (A), (B) and catalyst, reaction temperature, reaction time, etc., normally the aromatic hydroxyl compound (B) is used in an amount of about 0.5 to about 10.0 parts by weight per part by weight of the aromatic amine compound (A). If the amount of the component (B) is too small relative to that of the component (A), a polymeric product that is poor in initial coloration is obtained when the resulting condensation product is used as a polymer scale preventive agent. If the amount of the component (B) is too large, the resulting condensation product is poor in prevention of polymer scale.

For the condensation products of the components (A) and (B), preferred combination of (A) and (B) is as below.

1) (A): a compound of the general formula (3).
   (B): at least one member selected from the group consisting of the condensates of (I), (II) and (IV) above.
2) (A): a compound of the general formula (2).
   (B): at least one member selected from the group consisting of the condensates of (I) and (II) above.
3) (A): a compound of the general formula (1).
   (B): at least one member selected from the group consisting of the condensates of (I) and
4) (A): a compound of the general formula (3).
   (B): a natural aromatic hydroxyl-containing organic compound of (V).

Among the combinations above, particularly preferred is:
(A): a compound of the general formula (2) and/or a compound of the general formula (3)
(B): a condensation product of (I).

(C) Reaction stopper

In a preferred embodiment, (C) a reaction stopper is added to the reaction mixture at an suitable time during the condensation reaction of the components (A) and (B), so that further progress of the condensation is controlled and the degree of condensation is controlled. This is because if the condensation product of the components (A) and (B) has too high a degree of condensation, when it is dissolved in a solvent to prepare a coating liquid described later, it may form sedimentation and the coating liquid obtained is not uniform, thereby lowering the scale preventing effect. The addition of the component (C) makes it possible to store the condensation product of the components (A) and (B) for a long time.

As the reaction stopper (C), for instance, a reducing agent is used. The reducing agent includes, for example, hydrogen, hydrogen iodide, hydrogen bromide, hydrogen sulfide, hydrides such as lithium aluminum hydride, sodium borohydride, calcium borohydride, zinc borohydride, tetraalkylammonium borohydride, trichlorosilane, triethylsilane, and the like, lower oxides or lower oxyacids such as carbon monoxide, sulfur dioxide, sodium thiosulfate, sodium thiosulfite, sodium sulfite, potassium sulfite, sodium bisulfite, and sodium hydrosulfite, sulfur compounds such as Rongalit, sodium sulfide, sodium polysulfide, and ammonium sulfide, alkali metals such as sodium and lithium, metals that are electrically highly positive such as magnesium, calcium, aluminum and zinc and their amalgams, salts of metals in a lower valence state such as iron(II) sulfate, tin(II) chloride, titanium(III) trichloride, and the like, phosphorus compounds such as phosphorus trichloride, phosphorus triiodide, trimethylphosphine, triphenylphosphine, trimethylphosphite, and hexamethylphosphorus triamide, hydrazine, diborane, and substituted diboranes such as ethane-1,2-diaminoborane, dimethylamine-borane, and pyridine-borane. Among these compounds, preferred are hydrogen iodide, hydrogen bromide, sodium borohydride, sulfur dioxide, sodium thiosulfate, sodium thiosulfite, sodium sulfite, potassium sulfite, sodium bisulfite and Rongalit.

The reaction stoppers above can be used singly or in combination of two or more.

The component (C) is preferably added to the reaction mixture after the condensation reaction of the components (A) and (B) is initiated, and more preferably the component (C) is added to the reaction mixture just before a condensation product of the components (A) and (B) precipitates, that is, at the time when the condensation conversion of the components (A) and (B) has reached the range of 50 to 99% by weight, particularly 70 to 95% by weight. After the completion of the addition of the component (C), reaction is normally stopped or continued for up to 50 hours.

Condensation conversion of the components (A) and (B) herein means the total amount in % by weight of the components (A) and (B) consumed for the condensation based on the total amount of the components (A) and (B) charged as monomers. That is, condensation conversion of the components (A) and (B) is defined by the equation:

Condensation conversion (% by weight) $=[(c-d)/c]\times 100$ wherein c stands for the total amount in part(s) by weight of the components (A) and (B) charged as monomers, and d stands for the total amount in part(s) by weight of the unreacted components (A) and (B).

It normally takes 0.2 to 100 hours for the condensation conversion of the components (A) and (B) to reach 50 to 99% by weight, although the time depends on the kinds of the components (A) and (B), etc.

Where the reaction stopper (C) is added to the reaction mixture, the preferred amount of the component (C) is in the range of 0.01 to 2.0 parts by weight per part by weight of the components (A) and (B) in total.

The polymer scale preventive agent comprising the condensation product of the components (A) and (B) is used for forming a coating on, for example, the inner wall surfaces of a polymerization vessel, and the deposition of polymer scale is thereby prevented. To form such a coating, the polymer scale preventive agent is used in a liquid state, specifically as a solution or a dispersion. That is, it is used as a coating liquid.

Preparation of coating liquid

For example, the coating liquid mentioned above may be prepared by adding a solvent described below as required to a solution containing the condensation product of the components (A) and (B) resulting from the condensation reaction. Alternatively, the coating liquid may be prepared by removing the solvent from the solution containing the condensation product resulting from the condensation reaction, grinding the resulting solid condensation product, adding a solvent described below to the ground product obtained. Alternatively, it may be prepared by adding the ground condensation product mentioned above into a cold water to allow the condensation product to form sediment, filtering off and drying the sediment, and adding a solvent described below to the dried sediment.

Solvents to be used for preparation of the coating liquid include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl-isobutyl ketone, etc.; esters such as methyl formate, ethyl formate, methyl acetate, ethyl acetate, methyl acetoacetate, etc.; ethers such as 4-methyldioxolane, ethylene glycol diethyl ether, etc.; furans such as tetrahydrofuran, furfural, furfuryl alcohol, and tetrahydrofurfuryl alcohol; and aprotic solvents such as acetonitrile, dimethylformamide and dimethyl sulfoxide. These solvents may be used singly or as a mixed solvent of two or more thereof in a case-by-case basis.

Among the solvents above, particularly preferred are water, and mixed solvents of water and an organic solvent compatible with water. The organic solvent compatible with water includes, for example, alcohols such as methanol, ethanol and propanol, ketones such as acetone and methyl ethyl ketone, and esters such as methyl acetate and ethyl acetate. The mixed solvents of water and an organic solvent compatible with water preferably contains the organic solvent in such an amount that there is no fear about ignition or explosion and safety in handling is ensured as to virulence, etc. Specifically, the amount of the organic solvent is preferably 50% by weight or less, and more preferably 30% by weight or less.

In the case where water or a mixed solvent of water and an organic solvent compatible with water is used for the solvent for a coating liquid, the coating liquid is preferably alkaline, and the polymer scale preventing effect is thereby enhanced. This is presumably because alkalization of the coating liquid increases the solubility of the condensation product of the components (A) and (B) in the solvent and makes the coating liquid uniform. The coating liquid preferably has a pH of 7.5 to 13.5, and more preferably 8.0 to 12.5. As an alkaline compound to be used for adjusting pH, for example, alkali metal compounds such as LiOH, NaOH, KOH, $Na_2CO_3$, $Na_2HPO_4$, $NH_4OH$ and the like, ammonium compounds, and organic amine compounds such as ethylenediamine, monoethanolamine, triethanolamine and the like, can be used.

The concentration of the condensation product of the components (A) and (B) is not limited as long as a total coating weight described later can be obtained. Normally, the concentration is in the range of about 0.001 to about 15% by weight, preferably 0.01 to 5% by weight.

In order to further enhance the scale preventive effect, to the coating liquid described above is preferably added (D) a water-soluble polymeric compound and/or (E) at least one compound selected from the group consisting of a colloidal silica and an alkali metal silicate. More preferably, the (D) and (E) are used in combination Presumably, these additives interact with the condensation product of the components (A) and (B), so that the component (D) improves hydrophilic nature of the surface of the coating and the component (E) increases the adhesion of the coating to the inner wall, etc. of the polymerization vessel.

(D) Water-soluble polymeric compound

The water-soluble polymeric compounds include, for example, amphoteric polymeric compounds such as gelatin and casein, anionic polymeric compounds such as polyacrylic acid, polystyrenesulfonic acid, carboxymethyl cellulose, and alginic acid, cationic polymeric nitrogen-containing polymeric compounds such as polyvinylpyrrolidone and polyacrylamide, hydroxyl-containing polymeric compounds such as polyvinyl alcohol, hydroxyethyl cellulose, hydroxypropyl cellulose and pectin.

Among the water-soluble polymeric compounds above, preferred are gelatin, casein, polyacrylic acid, carboxymethyl cellulose, polyvinylpyrrolidone and pectin.

The amount of the water-soluble polymeric compound (D) is preferably in the range of 0.01 to 10 parts by weight, and more preferably from 0.05 to 3 parts by weight per part by weight of the condensation product of the components (A) and (B).

(E) Colloidal silica and/or alkali metal silicate

Colloidal silica is a colloid in which ultrafine particles of silicon dioxide (silica) are dispersed in an aqueous medium or a non-aqueous medium such as methanol, propanol, ethylene glycol, or the like. The colloidal particles generally have a particle diameter of 1 to 100 m$\mu$.

It is well-known that colloidal silica, for example, dispersed in an aqueous medium can be typically produced by adding hydrochloric acid to an aqueous sodium silicate solution, but production methods are not limited thereto. Any production methods can be used as long as the colloidal silica described above is produced.

The silicates of alkali metals include, for example, metasilicates ($M_2SiO_3$), orthosilicates ($M_4SiO_4$), bisilicates ($M_2Si_2O_5$), trisilicates ($M_3Si_3O_7$) and sesquisilicates ($M_4Si_3O_{10}$) of alkali metals such as lithium, sodium and potassium (where M stands for an alkali metal such as lithium, sodium or potassium), and water glass.

The amount of the component (E) is preferably in the range of 0.01 to 20 parts by weight, more preferably from 0.05 to 5 parts per part by weight of the condensation product of the components (A) and (B).

The water-soluble polymeric compound (D) may be added without any component (D), but it is preferably combined with the colloidal silica or the alkali metal silicate. Where the water-soluble polymeric compound is used in combination with the colloidal silica, the colloidal silica is used in an amount of preferably 5 to 3,000 parts by weight, more preferably 50 to 1,000 parts by weight per 100 parts by weight of the water-soluble polymeric compound. Where the water-soluble polymeric compound is used in combination with the alkali metal silicate, the alkali metal silicate is used in an amount of preferably 5 to 3,000 parts by weight, more preferably 50 to 1,000 parts by weight per 100 parts by weight of the water-soluble polymeric compound.

Formation of the coating

The polymer scale preventive liquid is applied to the inner walls of a polymerization vessel and then dried sufficiently at a temperature from room temperature to 100° C., for instance, followed by washing with water if necessary, to form the coating.

The polymer scale preventive liquid is preferably applied to not only the inner wall surfaces of a polymerization vessel but also other areas with which the monomer comes into contact during polymerization to form the coating on such areas. For example, on a stirring shaft, stirring blades, condensers, headers, search coil, bolts, nuts, etc.

More preferably, for formation of the coating, the polymer scale preventive liquid is applied to areas with which monomers does not come into contact during polymerization but on which polymer scale may deposit, for example, the areas with which unreacted monomers comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the polymer scale preventive liquid is directly applied to the heated inner wall surfaces, etc. After dried, the coated surfaces are washed with water if necessary.

The coating thus obtained normally has a coating weight of normally 0.001 g/m$^2$ to 5 g/m$^2$, and preferably from 0.05 to 2 g/m$^2$.

The coating operation may be conducted everyone to ten-odd batches of polymerization. The formed coating has good durability and retains the scale-preventing action; therefore the coating operation may be performed every several batches of polymerization. Thus, the polymerization vessel can be used repeatedly without deposition of polymer scale, and productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which of this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or salts thereof; and diene monomers such as butadiene, chloroprene and isoprene; styrene, acrylonitrile, vinylidene halides such as vinylidene chloride, and vinyl ethers. These may be used singly or in combination of two or more.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$·G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$·G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization.

The present invention makes it possible to prevent polymer scale from depositing, independent of materials constituting the inner wall, etc. of a polymerization vessel. For example, this invention can prevent deposition of polymer scale even in the case polymerization is carried out in a polymerization vessel made of a steel including stainless steel or lined with glass.

Any additive materials that have been conventionally added in a polymerization-system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

Addition to polymerization mass

The polymer scale preventive agent of the present invention may be added to a polymerization mass in addition to the formation of the coating, so that the scale preventing effect is further improved. The amount of the polymer scale preventive agent to be added to the polymerization mass preferably in the range of about 10 to about 1,000 ppm based on the whole weight of the monomers charged. The polymer scale preventive agent is normally added in the form of liquid like the coating liquid described above, although the form thereof is not limited. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other experiments are working examples of the present invention.

(I) Production of aromatic hydroxyl compound-acetone condensates

Production Example 1

Pyrogallol-acetone condensate

Pyrogallol (200 g) was dissolved in 1.4 kg of acetone, and 20 g of phosphorus oxychloride was added to the solution obtained. The resulting mixture was allowed to stand at room temperature overnight. The mixture was then added dropwise to water under stirring. The sediment formed was filtered off, washed with a small amount of acetone, and the acetone solution thus obtained was poured into a plenty amount of water. The sediment formed in the water was filtered off and dried to give a pyrogallol-acetone condensate. The melting point was measured to be 200°–210° C.

Production Example 2

Resorcinol-acetone condensate

The procedure of Production Example 1 was repeated except that resorcinol was used in-place of the pyrogallol, to give a resorcinol-acetone condensate with a melting point of 170°–180° C.

(II) Production of aromatic hydroxyl compound-aldehyde condensates

Production Example 3

Phenol-formaldehyde condensate

Phenol (300 g), 220 g of 37% aqueous formaldehyde solution (molar ratio of phenol:formaldehyde=1:0.85) and 0.3 ml of 35% concentrated hydrochloric acid were mixed, and the mixture was heated at 85° C. under reflux with stirring for 5 hours. The mixture was subsequently cooled and then added dropwise to water under stirring. The sediment formed was filtered off, and dissolved in a small amount of methanol. The resulting methanol solution was added to a plenty of water. The sediment formed in the water was filtered off and dried to give a phenolformaldehyde condensate.

Production Example 4

Pyrogallol-formaldehyde condensate

The procedure of Production Example 3 was repeated except that pyrogallol was used in place of phenol, to give a pyrogallol-formaldehyde condensate.

Production Example 5

2,3-dihydroxynaphthalene-formaldehyde condensate

The procedure of Production Example 3 was repeated except that phenol was replaced with 2,3dihydroxynaphthalene, the 35% concentrated hydrochloric acid was replaced with 0.1 ml of phosphoric acid, and the reaction solution to be subjected to reflux was added with 100 g of acetone and then was heated under reflux, to give a 2,3-dihydroxynaphthalene-formaldehyde condensate.

Production Example 6

1,4,5,8-Tetrahydroxynaphthalene-formaldehyde condensate

The procedure of Production Example 5 was repeated, except that the 2,3-dihydroxynaphthalene was replaced with 1,4,5,8-tetrahydroxynaphthalene, to give a 1,4,5,8-tetrahydroxynaphthalene-formaldehyde condensate.

(III) Aromatic hydroxyl compound condensate

Production Example 7

2,7-dihydroxynaphthalene condensate

Fifty (50) g of 2,7-dihydroxynaphthalene was dissolved in 1,000 g of methanol, and to the solution obtained 30 g of 30% aqueous hydrogen peroxide was added under stirring. The mixture obtained was heated at 80° C. under reflux for 5 hours. After cooled, the reaction mixture was added to water to settle the product. The sediment formed was filtered off and dried to give a 2,7-dihydroxynaphthalene condensate.

(IV) Aromatic hydroxyl compound-aromatic amine compound condensate

Production Example 8

2,7-Dihydroxynaphthalene-p-aminophenol condensate

To 10 liters of acetone were added 50 g of 2,7-dihydorxynaphthalene, 50 g of p-aminophenol and 10 g of periodic acid. The mixture obtained was reacted at 80° C. for 5 hours, and thereafter was cooled to give a solution of 2,7-dihydroxynaphthalene-p-aminophenol in acetone.

Production Example 9

Catechol-4-aminodiphenylamine condensate

In 10 liters of methanol were dissolved 50 g of catechol and 50 g of 4-aminodiphenylamine. The pH of the solution obtained was adjusted to 8.0 by adding triethanolamine. Subsequently, 30 g of 30% aqueous hydrogen peroxide was added to the solution. The resulting mixture was reacted at 130° C. for 5 hours, and thereafter cooled to give a solution of a catechol-4-aminodiphenylamine condensate in methanol.

Production of condensation products of components (A) and

Production Example 10

Production of Condensation Product. No. 1

An autoclave was charged with 3 kg of methanol, 30 g of 1,8-diaminonaphthalene and 75 g of the pyrogallolacetone condensate, and these were mixed by stirring at room temperature to prepare a methanol solution.

Separately, 15 g of potassium periodate was added to 2 kg of water and dissolved therein by stirring at room temperature. The aqueous solution thus obtained was added to the methanol solution prepared above, and after mixing the mixture obtained was heated to 80° C. and reacted at the temperature for 5 hours. Subsequently, the reaction mixture was cooled, and then was mixed with water in an amount 5 times that of the reaction mixture. The sediment formed was filtered off and dried to give the desired condensation product (No.1). Yield: 88%.

Production Example 11

Productions of Condensation Product Nos. 2 to 13

In each production, the procedure of Production Example 10 was repeated, except that an aromatic amine compound (A), an aromatic hydroxyl condensate (B), a catalyst and a solvent given in Table 1 were used, and reaction was carried out under the conditions with respect to temperature and time specified in Table 1, give a condensation product of Nos. 2 to 13.

TABLE 1

| Condensation product No. | (A) Aromatic amide compound | (B) Aromatic hydroxy compound condensate | (C) Catalyst | (A):(B):(C) (wt. ratio) | Solvent (wt. ratio) | Reaction temperature (°C.) | Reaction time (hr.) |
|---|---|---|---|---|---|---|---|
| 1 | 1,8-Diamino-naphthalene | Pyrogallol-acetone condensate | Potassium periodate | 100:250:50 | Methanol/Water (60/40) | 80 | 5 |
| 2* | 1,8-Diamino-naphthalene | — | Potassium periodate | 100:0:50 | Methanol/Water (60/40) | 80 | 5 |
| 3* | 1,8-Diamino-naphthalene | Pyrogallol-acetone condensate | — | 100:250:0 | Methanol/Water (60/40) | 80 | 5 |
| 4* | — | Pyrogallol-acetone condensate | Potassium periodate | 0:250:50 | Methanol/Water (60/40) | 80 | 5 |

TABLE 1-continued

| Condensation product No. | (A) Aromatic amide compound | (B) Aromatic hydroxy compound condensate | (C) Catalyst | (A):(B):(C) (wt. ratio) | Solvent (wt. ratio) | Reaction temperature (°C.) | Reaction time (hr.) |
|---|---|---|---|---|---|---|---|
| 5 | 4-Amino-diphenylamine | Resorcinol-acetone condensate | Iodic acid | 100:300:10 | Methanol/Water (50/50) | 50 | 5 |
| 6 | 1,5-Diamino-naphthalene | Phenol-formaldehyde condensate | Potassium persulfate | 100:100:30 | Methanol/Water (70/30) | 150 | 0.5 |
| 7 | 1,8-Diamino-naphthalene | 2,3-Dihydroxynaphthalene-formaldehyde condensate | Sodium peroxide | 100:100:5 | Methanol/Water (80/20) | 80 | 3 |
| 8 | 1,8-Diamino-naphthalene | 1,4,5,8-Tetrahydorxy-naphthalene-formaldehyde condensate | Iodic acid | 100:900:20 | Methanol/Water (80/20) | 60 | 5 |
| 9 | 2,3-Diamino-naphthalene | 2,7-Dihydroxynaphthalene-p-aminophenol condensate | Hydrogen peroxide | 100:800:50 | Methanol/Water (90/10) | 25 | 20 |
| 10 | 4-Amino-diphenylamine | Pyrogallol-acetone condensate | Periodic acid | 100:300:50 | Methanol/Water (80/20) | 50 | 5 |
| 11 | 4-Amino-diphenylamine | Pyrogallol-acetone condensate | Periodic acid | 100:300:50 | Methanol/Water (80/20) | 50 | 5 |
| 12 | 1,8-Diamino-naphthalene | 2,7-Dihydroxynaphthalene condensate | Periodic acid | 100:500:50 | Methanol/Water (90/10) | 80 | 3 |
| 13 | 4-Methoxy-ortho-phenylenediamine | Pyrogallol-acetone condensate | Potassium periodate | 100:400:30 | Methanol/Water (50/50) | 80 | 3.0 |

Example 1 (Experiment Nos. 101 to 113)

In each experiment, polymerization was conducted using a stainless steel polymerization vessel with an inner capacity of 1,000 liters and having a stirrer, as described below.

First, a condensation product was dissolved in a solvent to prepare a coating liquid with a concentration given in Table 2. The coating liquid was applied to the inner wall, the stirring shaft, the stirring blades and other areas with which a monomer comes into contact of the polymerization vessel. The applied coating liquid was dried by heating at 40° C. for 15 minutes to form a coating, which was then washed with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization at 66° C. for 6 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 30 times. After the 30th batch, the amount of polymer scale on an area located in the liquid during polymerization and on an area in the vicinity of the interface between the gas and liquid phases, was measured according the method below.

The number of fish eyes which may appear when a polymer is formed into sheet was measured with respect to the polymers produced in the experiments according to the method below.

Further, to evaluate initial coloration at the time a polymer is formed into sheet, luminosity index L was measured according to the method below.

Measurement of the amount of polymer scale

The scale deposited in an area of 10 cm square on the inner wall is scraped off with a stainless steel spatula as completely as possible to be confirmed with naked eyes, and then the scraped scale is weighted on a balance. Thereafter, the amount of the deposited scale per area of 1 m$^2$ is obtained by multiplying the measured value by 100.

Measurement of fish eyes..

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 cm$^2$ by light transmission.

Measurement of luminosity index L

A hundred parts by weight of a polymer,-1 part by weight of a tin laurate stabilizing agent (trade name: TS-101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a-mold measuring 4 cm×4 cm×1.5 cm (depth), and molded under heating at 160° C. and a pressure of 65 to 70 kgf/cm$^2$ to prepare a test specimen. This test specimen is measured for luminosity index L in the Hunter's color difference equation described in JIS Z 8730 (1980). The lower initial coloration, the more the value of L.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L = 10Y^{\frac{1}{2}}$ described in JIS Z 8730 (1980).

The results are given in Table 2.

TABLE 2

| Exp. No. | Condensation product No. | Concentration (wt. %) | Solvent (weight ratio) | pH adjuster | pH | Polymerization result after the 30th batch | | | L value |
|---|---|---|---|---|---|---|---|---|---|
| | | | | | | Amount of polymer scale (g/m$^2$) | | No. of fish-eye | |
| | | | | | | Liquid phase | Around interface of gas-liquid phases | | |
| 101 | 1 | 0.3 | Water/Methanol (50/50) | Sodium hydroxide | 9.5 | 0 | 3 | 4 | 71.7 |
| 102* | 2 | 0.3 | Water/Methanol (50/50) | Sodium hydroxide | 9.5 | 13 | 82 | 23 | 69.8 |
| 103* | 3 | 0.3 | Water/Methanol (50/50) | Sodium hydroxide | 9.5 | 58 | 1400 | 41 | 69.7 |
| 104* | 4 | 0.3 | Water/Methanol (50/50) | Sodium hydroxide | 9.5 | 48 | 950 | 36 | 70.9 |
| 105 | 5 | 0.2 | Water/Methanol (50/50) | Sodium hydroxide | 9.5 | 0 | 4 | 4 | 71.5 |
| 106 | 6 | 0.2 | Water/Methanol (50/50) | Sodium hydroxide | 10.0 | 0 | 7 | 6 | 71.6 |
| 107 | 7 | 0.2 | Water/Methanol (50/50) | Sodium hydroxide | 11.0 | 0 | 7 | 5 | 71.6 |
| 108 | 8 | 0.3 | Water/Methanol (50/50) | Triethanolamine | 12.0 | 0 | 6 | 5 | 71.6 |
| 109 | 9 | 0.3 | Water/Methanol (50/50) | Sodium hydroxide | 11.0 | 0 | 6 | 5 | 71.5 |
| 110 | 10 | 0.5 | Water/Methanol (70/30) | Sodium hydroxide | 12.5 | 0 | 7 | 6 | 71.6 |
| 111 | 11 | 0.3 | Water/Methanol (70/30) | Sodium hydroxide | 10.0 | 0 | 8 | 7 | 71.5 |
| 112 | 12 | 0.2 | Water/Methanol (80/20) | Sodium hydroxide | 10.0 | 0 | 14 | 9 | 71.4 |
| 113 | 13 | 0.2 | Water/Methanol (80/20) | Ethylenediamine | 10.0 | 0 | 10 | 7 | 71.5 |

Production Example 12

Production of Condensation Product No. 14

An autoclave was charged with 3 kg of methanol, 30 g of 1,8-diaminonaphthalene and 120 g of wattle tannin, and these were mixed by stirring at room temperature to prepare a methanol solution.

Separately, 30 g of potassium periodate was added to 2 kg of water and dissolved therein by stirring at room temperature. The aqueous solution thus obtained was added to the methanol solution prepared above, and after mixing the mixture obtained was heated to 50° C. and reacted at the temperature for 5 hours. Subsequently, the reaction mixture was cooled and was then mixed with water in an amount 5 times that of the reaction mixture. The sediment formed was filtered off and dried to give the desired condensation product (No. 14).

Production Example 13

Productions of Condensation Product Nos. 15 to 23

In each production, the procedure of Production Example 12 was repeated, except that an aromatic amine compound (A), a natural aromatic hydroxyl-containing condensate (B), a catalyst and a solvent given in Table 3 were used, and reaction was carried out under the conditions of temperature and time given in Table 3, to give a condensation product of Nos. 15 to 23.

It is to be noted that in the production of Condensation Product of Nos. 15–17 (comparative examples), one of the aromatic amine compound (A), the natural hydroxy-containing compound (B) and the catalyst was not used. In these production experiments, it is considered that no condensation product was produced.

TABLE 3

| Condensation product No. | (A) Aromatic amine compound | (B) Natural aromatic hydroxyl-containing compound | (C) Catalyst | (A):(B):(C) (wt. ratio) | Solvent (wt. ratio) | Reaction temperature (°C.) | Reaction time (hr.) |
|---|---|---|---|---|---|---|---|
| 14 | 1,8-Diaminonaphthalene | Wattle tannin | Potassium periodate | 100:400:100 | Methanol/Water (40/60) | 50 | 5 |
| 15* | 1,8-Diaminonaphthalene | — | Potassium periodate | 100:0:100 | Methanol/Water (40/60) | 50 | 5 |
| 16* | 1,8-Diaminonaphthalene | Wattle tannin | — | 100:400:0 | Methanol/Water (40/60) | 50 | 5 |
| 17* | — | Wattle tannin | Potassium periodate | 0:400:100 | Methanol/Water (40/60) | 50 | 5 |
| 18 | 4-Aminodiphenylamine | Mimosa tannin | Potassium persulfate | 100:700:20 | Methanol/Water (50/50) | 80 | 0.5 |
| 19 | 2-Aminodiphenylamino | oak tannin | Hydrogen peroxide | 100:500:100 | Methanol/Water (20/80) | 30 | 5 |
| 20 | 4-Aminodiphenylamino | Quebracho tannin | Peracetic acid | 100:500:10 | Methanol/Water (20/80) | 130 | 1 |
| 21 | Para-aminophenol | Chinese gallotannin | Periodic acid | 100:500:50 | Methanol/Water (50/50) | 100 | 0.5 |
| 22 | Orthoaminophenol | Tannin of persimmon | Ammonium persulfate | 100:500:50 | Methanol/Water (30/70) | 50 | 5 |
| 23 | Aniline | Mimosa tannin | Hydrogen peroxide | 100:500:50 | Methanol/Water (30/70) | 50 | 5 |

Example 2 (Experiment Nos. 201 to 211)

In each experiment, polymerization was conducted using a stainless steel polymerization vessel with an inner capacity of 1,000 liters and having a stirrer, as described below.

First, a condensation product was dissolved in a solvent to prepare a coating liquid with a concentration given in Table 4. The coating liquid was applied to the inner wall, the stirring shaft, the stirring blades and other areas with which a monomer comes into contact of the polymerization vessel. The applied coating liquid was dried by heating at 40° C. for 15 minutes to form a coating, which was then washed with water.

It is to be noted that in the experiment of No. 211 (comparative example), the coating liquid containing Condensation Product No.1 described in Japanese Patent Publication (KOKOKU) No. 60-30681(1985) was applied to the inner wall, etc.

Thereafter, in the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 30 times. After the 30th batch, the amount of polymer scale on an area located in the liquid during polymerization and on an area in the vicinity of the interface between the gas and liquid phases, was measured in the same manner as in Example 1.

The number of fish eyes which may appear on a formed sheet was measured in the same manner as in Example 1.

Further, to evaluate initial coloration in regard to a formed sheet, luminosity index L was measured in the same manner as in Example 1.

The results are given in Table 4.

the polymerization, the produced polymer was taken out and unreacted monomer was recovered out of the polymerization vessel. Subsequently, the inside of the polymerization vessel was washed with water and residual resin was removed.

The batch comprising the operations from forming a coating through polymerizing to washing with water was repeated 10 times. After the 10th batch, the amount of polymer scale on an area located in the liquid during polymerization and on an area in the vicinity of the interface between the gas and liquid phases, was measured in the same manner as in Example 1.

Further, to evaluate initial coloration at the time a polymer is formed into sheet, luminosity index L was measured according to the method below.

The results are given in Table 5.

Measurement of luminosity index L

To 1 kg of a polymer latex obtained was added 1 kg of 2% magnesium sulfate solution to cause aggregation and sedimentation. The sediment was filtered off, washed with a hot water at 80° to 90° C. twice or three

TABLE 4

| Exp. No. | Condensation product No. | Concentration (wt. %) | Solvent (weight ratio) | pH adjuster | pH | Polymerization result after the 30th batch |||| 
|---|---|---|---|---|---|---|---|---|---|
| | | | | | | Amount of polymer scale (g/m$^2$) ||||
| | | | | | | Liquid phase | Around interface of gas-liquid phases | No of fish-eye | L value |
| 201 | 14 | 0.3 | Water/Methanol (70/30) | Sodium hydroxide | 10.0 | 0 | 3 | 4 | 71.6 |
| 202* | 15* | 0.3 | Water/Methanol (70/30) | Sodium hydroxide | 10.0 | 15 | 87 | 22 | 69.8 |
| 203* | 16* | 0.3 | Water/Methanol (70/30) | Sodium hydroxide | 10.0 | 18 | 92 | 25 | 69.9 |
| 204* | 17* | 0.3 | Water/Methanol (70/30) | Sodium hydroxide | 10.0 | 42 | 870 | 35 | 71.1 |
| 205 | 18 | 0.05 | Water/Methanol (50/50) | Sodium hydroxide | 10.5 | 0 | 7 | 5 | 71.7 |
| 206 | 19 | 0.2 | Water/Methanol (50/50) | Triethanolamine | 11.0 | 0 | 3 | 4 | 71.6 |
| 207 | 20 | 0.2 | Water/Methanol (50/50) | Ethylenediamine | 11.0 | 0 | 3 | 4 | 71.6 |
| 208 | 21 | 0.2 | Water/Methanol (50/50) | Sodium hydroxide | 11.0 | 0 | 12 | 10 | 71.6 |
| 209 | 22 | 0.2 | Water/Methanol (70/30) | Sodium hydroxide | 11.0 | 0 | 13 | 10 | 71.5 |
| 210 | 23 | 0.2 | Water/Methanol (70/30) | Sodium hydroxide | 11.0 | 0 | 11 | 10 | 71.5 |
| 211 | — | 0.2 | Water/Methanol (50/50) | — | — | 0 | 260 | 58 | 69.3 |

Example 3 (Experiment Nos. 301 to 306)

In each experiment, the coating procedure of Example 2 was repeated, except that the polymerization vessel was replaced with a stainless steel polymerization vessel with an inner capacity of 20 liters and having a stirrer, and a coating liquid specified in Table 5 with respect to the kind of the condensation product, concentration thereof, composition of solvent, pH of the coating liquid, and pH adjuster used, was used.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours. After the completion of times and dried at 40° C. for 25 hours in a vacuum dryer to give a resin. The resin was placed in a mold measuring $9 \times 9 \times 0.1$ cm (depth), heated at 195° C. under a pressure of 50 to 60 kgf/cm$^2$ and press molded under the final pressure of 80 kgf/cm$^2$ to prepare a test specimen.

This test specimen was measured for luminosity index L in the same manner as in Example 1.

TABLE 5

| Exp. No. | Condensation product No. | Concentration (wt. %) | Solvent (weight ratio) | pH adjuster | pH | Polymerization result after the 10th batch ||| 
|---|---|---|---|---|---|---|---|---|
| | | | | | | Amount of polymer scale (g/m$^2$) |||
| | | | | | | Liquid phase | Around interface of gas-liquid phases | L value |
| 301 | 14 | 0.2 | Water/Methanol (50/50) | Sodium hydroxide | 9.0 | 0 | 7 | 85.3 |
| 302* | 15* | 0.2 | Water/Methanol (50/50) | Sodium hydroxide | 9.0 | 78 | 480 | 80.6 |
| 303* | 16* | 0.2 | Water/Methanol (50/50) | Sodium hydroxide | 9.0 | 3 | 120 | 82.3 |
| 304* | 17* | 0.2 | Water/Methanol (50/50) | Sodium hydroxide | 9.0 | 90 | 520 | 85.1 |
| 305 | 18 | 0.2 | Water/Methanol (70/30) | Sodium hydroxide | 10.0 | 0 | 4 | 85.2 |
| 306 | 18 | 0.3 | Water/Methanol (60/40) | Triethanolamine | 9.0 | 0 | 3 | 85.2 |

Production Example 14

Production of Condensation Product No. 24

An autoclave was charged with 1.5 kg of methanol and 20 g of p-aminophenol and 10 g of 4-aminodiphenylamine as the aromatic amine compound, and these were mixed by stirring at room temperature to prepare a methanol solution.

Separately, 2 g of potassium periodate was added to 0.5 kg of water and dissolved therein by stirring at room temperature to prepare an aqueous solution. The aqueous solution thus obtained was added to the methanol solution prepared above, and after mixing the mixture obtained was heated to 50° C. and reacted at the temperature for 3 hours. Subsequently, to the reaction mixture was added a solution containing 20 g of the pyrogallol-acetone condensate as the aromatic hydroxyl compound condensate (B) in 0.5 kg of methanol. At that time of the addition, the condensation conversion of the aromatic amine compound (A) was measured by the method below to be 79% by weight.

After the addition of the pyrogallol-acetone condensate solution in methanol, reaction was continued for another 5 hours. Thereafter, the reaction mixture was cooled and mixed with water in an amount 5 times that of the reaction mixture. The sediment formed was filtered off and dried to give the desired condensation product (No. 24).

Measurement of condensation conversion

The unreacted aromatic amine compound (i.e., p-aminophenol and 4-aminodiphenylamine-in the Production Example 14) in a reaction mixture is determined by liquid chromatography.

The condensation conversion is calculated by the equation:

Condensation conversion(% by weight)=[(a−b)/a]×100 wherein a stands for the total amount of the aromatic amine compounds charged and b stands for the amount of the unreacted aromatic amine compounds determined as above.

Production Example 15

Production of Condensation Product Nos. 25 to 41

Condensation Product Nos. 25–41 were produced in the same manner as in Production of Condensation Product No. 24, except that in each experiment, an aromatic amine compound, an aromatic hydroxyl compound condensate, catalyst and solvent specified in Table 6 were used, and the condensation was conducted at a temperature specified in Table 6. In Table 6, time which lapsed until the addition of an aromatic hydroxyl compound condensate, the condensation conversion of an aromatic amine compound when the aromatic hydroxyl compound began to be added, and the time required for the entire condensation reaction, are also given.

TABLE 6

| Condensation product No. | (A-1) Aromatic amine compound | (A-2) Aromatic amine compound | (B) Aromatic hydroxy compound condensate | (C) Condensation catalyst | Time which lapsed until addition of (B) | Condensation conversion (%) | (A-1):(A-2):(B): Catalyst (wt. ratio) | (A) + (C) Total concentration (%) | Solvent (wt. ratio) | Reaction temperature (°C.) | Total reaction time (hr.) |
|---|---|---|---|---|---|---|---|---|---|---|---|
| 24 | Para-aminophenol | 4-Aminodiphenylamine | Pyrogallol-acetone condensate | Potassium periodate | 3 | 79 | 100:50:100:10 | 2 | Methanol/Water (60/40) | 50 | 8 |
| 25 | Para-aminophenol | 4-Aminodiphenylamine | Pyrogallol-formaldehyde condensate | Potassium periodate | 5 | 82 | 100:50:50:30 | 2 | Methanol/Water (60/40) | 50 | 10 |
| 26 | Para-aminophenol | — | Pyrogallol-acetone condensate | Potassium periodate | 5 | 85 | 100:—:100:10 | 2 | Methanol/Water (60/40) | 50 | 10 |
| 27 | 1,8-Diaminonaphthalene | — | Pyrogallol-formaldehyde condensate | Iodic acid | 5 | 83 | 100:—:200:10 | 2 | Methanol/Water (60/40) | 50 | 10 |
| 28 | Para-aminosalicylic acid | — | Cathecol-4-aminodiphenylamine condensate | Sodium perchlorate | 4 | 87 | 100:—:100:50 | 1 | Methanol/Water (70/30) | 80 | 5 |
| 29 | 4-Amino-diphenenylamine | — | 2,7-Dihydroxynaphthalene-p-aminophenol condensate | Perbenzoic acid | 4 | 85 | 100:—:200:50 | 3 | Methanol/Water (70/30) | 80 | 5 |
| 30 | 1-Amino-5-hydroxynaphthalene | — | Pyrogallol-acetone condensate | Sodium persulfate | 10 | 84 | 100:—:200:50 | 4 | Methanol/Water (70/30) | 40 | 15 |
| 31 | 5-Nitro-2-aminophenol | — | Pyrogallol-acetone condensate | Hydrogen peroxide | 15 | 79 | 100:—:50:20 | 2 | Methanol/Water (70/30) | 30 | 20 |
| 32 | 2-Amino-4-chlorophenol | — | Pyrogallol-1,8-phenylenediamine condensate | Ammonium persulfate | 10 | 86 | 100:—:50:10 | 2 | Methanol/Water (70/30) | 40 | 15 |
| 33 | 2-Aminodiphenylamine | — | Pyrogallol-acetone condensate | Sodium peroxide | 10 | 87 | 100:—:100:30 | 2 | Methanol/Water (70/30) | 40 | 15 |

TABLE 6-continued

| Condensation product No. | (A-1) Aromatic amine compound | (A-2) Aromatic amine compound | (B) Aromatic hydroxyl compound condensate | (C) Condensation catalyst | Time which lapsed until addition of (B) | Condensation conversion (%) | (A-1): (A-2): (B): Catalyst (wt. ratio) | (A) + (C) Total concentration (%) | Solvent (wt. ratio) | Reaction temperature (°C.) | Total reaction time (hr.) |
|---|---|---|---|---|---|---|---|---|---|---|---|
| 34 | Para-aminophenol | 1,8-Diamino-naphthalene | Pyrogallol-p-phenylene-diamine condensate | Potassium periodate | 10 | 83 | 100:50:100:50 | 2 | Methanol/Water (60/40) | 40 | 15 |
| 35 | 2-Nitro-4-aminophenol | Meta-phenylene-diamine | 2,7-Hydroxy-naphthalene-p-aminophenol condensate | Potassium periodate | 0.5 | 91 | 100:20:50:10 | 3 | Methanol/Water (50/50) | 150 | 1 |
| 36 | Meta-aminophenol | α-Naphthylamine | Phenol-formaldehyde condensate | Potassium periodate | 5 | 87 | 100:10:200:10 | 2 | Methanol/Water (50/50) | 50 | 8 |
| 37 | Para-aminophenol | 1,5-Diamino-naphthalene | Pyrogallol-formaldehyde condensate | Perbenzoic acid | 5 | 83 | 100:50:200:20 | 1 | Methanol/Water (70/30) | 50 | 8 |
| 38 | 2-Amino-4-chlorophenol | 2,3-Diamino-toluene | Pyrogallol-acetone condensate | Ammonium persulfate | 1 | 90 | 100:50:300:30 | 1 | Methanol/Water (70/30) | 100 | 2 |
| 39 | Para-aminophenol | 4-Amino-diphenyl-amine | Wattle tannin | Ammonium persulfate | 10 | 92 | 100:50:50:50 | 2 | Methanol/Water (80/20) | 40 | 15 |
| 40 | Para-aminophenol | 4,4'-Diamino diphenylamin | Minosa tannin | Benzoyl peroxide | 20 | 91 | 100:10:100:20 | 2 | Methanol/Water (80/20) | 30 | 25 |
| 41 | Para-aminobenzene-sulfonic acid | α-Naphthylamine | Mangrove tannin | Sodium perchlorate | 30 | 94 | 100:10:100:50 | 2 | Methanol/Water (80/20) | 30 | 50 |

Example 4 (Experiment Nos. 401–421)

In each experiment, polymerization was conducted using a stainless steel polymerization vessel with an inner capacity of 1,000 liters and having a stirrer, as described below.

The condensation product used in each experiment is shown in Table 7. First, a condensation product was dissolved in a solvent having the composition specified in Table 7 so that the resulting solution may have a concentration given in Table 7. Thereafter, a pH adjuster was added to the solution as shown in Table 7 to prepare a coating liquid. The coating liquid was applied to the inner wall, the stirring shaft, the stirring blades and other areas with which a monomer comes into contact of the polymerization vessel. The applied coating liquid was dried by heating at 40° C. for 15 minutes to form a coating, which was then washed with water.

It is noted that the condensation products of the components (A) and (B) used in the experiments of Nos. 419 to 421 were produced by a process in which an aromatic hydroxyl compound condensate (B) began to be added to the condensation reaction mixture at the beginning of the condensation reaction.

Thereafter, in the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, the amount of polymer scale on an area located in the liquid during polymerization and on an area in the vicinity of the interface between the gas and liquid phases, was measured in the same manner as in Example 1.

The number of fish eyes which may appear on a formed sheet was measured in the same manner as in Example 1.

Further, to evaluate initial coloration in regard to a formed sheet, luminosity index L was measured in the same manner as in Example 1.

The results are given in Table 7.

TABLE 7

| Exp. No. | Condensation product No. | Concentration (wt. %) | Solvent (weight ratio) | pH adjuster | pH | Polymerization result after the 50th batch ||||
|---|---|---|---|---|---|---|---|---|---|
| | | | | | | Amount of polymer scale (g/m$^2$) || No. of fish-eye | L value |
| | | | | | | Liquid phase | Around interface of gas-liquid phases | | |
| 401 | 24 | 0.3 | Water/Methanol (90/10) | Sodium hydroxide | 9.0 | 0 | 2 | 4 | 72.3 |
| 402 | 25 | 0.3 | Water/Methanol (90/10) | Sodium hydroxide | 9.0 | 0 | 3 | 4 | 72.2 |
| 403 | 26 | 0.2 | Water/Methanol (90/10) | Sodium hydroxide | 9.5 | 0 | 10 | 7 | 72.2 |
| 404 | 27 | 0.1 | Water/Methanol (90/10) | Potassiun hydroxide | 10.0 | 0 | 14 | 7 | 72.4 |
| 405 | 28 | 0.3 | Water/Methanol (80/20) | Sodium hydroxide | 10.0 | 0 | 17 | 7 | 72.4 |
| 406 | 29 | 0.3 | Water/Methanol (80/20) | Monoethanolamine | 10.0 | 0 | 18 | 8 | 72.3 |
| 407 | 30 | 0.5 | Water/Methanol (80/20) | Ethylenediamine | 11.0 | 0 | 14 | 7 | 72.3 |
| 408 | 31 | 0.3 | Water/Methanol (80/20) | Potassium hydroxide | 11.0 | 0 | 12 | 6 | 72.3 |
| 409 | 32 | 0.3 | Water/Methanol (95/5) | Sodium hydroxide | 11.0 | 0 | 16 | 7 | 72.3 |
| 410 | 33 | 0.5 | Water/Methanol (80/20) | Sodium hydroxide | 10.0 | 0 | 11 | 6 | 72.2 |
| 411 | 34 | 0.5 | Water/Methanol (80/20) | Sodium hydroxide | 12.0 | 0 | 4 | 4 | 72.2 |
| 412 | 35 | 0.3 | Water/Methanol (80/20) | Sodium hydroxide | 12.0 | 0 | 4 | 4 | 72.3 |
| 413 | 36 | 0.3 | Water/Methanol (80/20) | Sodium hydroxide | 12.0 | 0 | 3 | 3 | 72.3 |
| 414 | 37 | 0.3 | Water/Methanol (80/20) | Sodium hydroxide | 11.0 | 0 | 7 | 4 | 72.3 |
| 415 | 38 | 0.3 | Water/Methanol (80/20) | Sodium hydroxide | 11.0 | 0 | 3 | 3 | 72.3 |
| 416 | 39 | 0.3 | Water/Methanol (80/20) | Sodium hydroxide | 11.0 | 0 | 5 | 4 | 72.3 |
| 417 | 40 | 0.3 | Water/Methanol (80/20) | Sodium hydroxide | 10.0 | 0 | 4 | 4 | 72.3 |
| 418 | 41 | 0.3 | Water/Methanol (80/20) | Sodium hydroxide | 10.0 | 0 | 4 | 4 | 72.3 |
| 419 | 1 | 0.3 | Water/Methanol (90/10) | Sodium hydroxide | 9.0 | 2 | 120 | 41 | 72.2 |
| 420 | 6 | 0.3 | Water/Methanol (90/10) | Sodium hydroxide | 9.0 | 1 | 135 | 40 | 72.2 |
| 421 | 14 | 0.3 | Water/Methanol (90/10) | Sodium hydroxide | 9.0 | 2 | 138 | 42 | 72.2 |

Example 5 (Experiment Nos. 501 to 521)

In each experiment, the coating procedure of Example 4 was repeated, except that the polymerization vessel was replaced with a stainless steel polymerization vessel with an inner capacity of 20 liters and having a stirrer, and a coating liquid specified in Table 8 with respect to the kind of the condensation product, concentration thereof, composition of solvent, pH of the coating liquid, and pH adjuster used, was used.

Thereafter, in the polymerization vessel in which the coating was formed as above, polymerization was carried out in the same manner as in Example 3. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 30 times. After the 30th batch, the amount of polymer scale on an area located in the liquid during polymerization and on an area in the vicinity of the interface between the gas and liquid phases, was measured.

Further, to evaluate initial coloration at the time a polymer is formed into sheet, luminosity index L was measured in the same manner as in Example 3.

The results are given in Table 8.

TABLE 8

| Exp. No. | Condensation product No. | Concentration (wt. %) | Solvent (weight ratio) | pH adjuster | pH | Polymerization result after the 30th batch |||
|---|---|---|---|---|---|---|---|---|
| | | | | | | Amount of polymer scale (g/m$^2$) || L value |
| | | | | | | Liquid phase | Around interface of gas-liquid phases | |
| 501 | 24 | 0.3 | Water/Methanol (90/10) | Sodium hydroxide | 9.5 | 0 | 10 | 85.7 |
| 502 | 25 | 0.3 | Water/Methanol (90/10) | Sodium hydroxide | 9.5 | 0 | 12 | 85.6 |
| 503 | 26 | 0.3 | Water/Methanol (90/10) | Sodium hydroxide | 9.5 | 0 | 47 | 85.6 |
| 504 | 27 | 0.3 | Water/Methanol (70/30) | Sodium hydroxide | 9.5 | 0 | 49 | 85.7 |
| 505 | 28 | 0.2 | Water/Methanol (70/30) | Sodium hydroxide | 10.5 | 0 | 34 | 85.6 |
| 506 | 29 | 0.5 | Water/Methanol (90/10) | Sodium hydroxide | 10.5 | 0 | 37 | 85.6 |
| 507 | 30 | 0.3 | Water/Methanol (90/10) | Sodium hydroxide | 11.0 | 0 | 35 | 85.6 |
| 508 | 31 | 0.3 | Water/Methanol (80/20) | Sodium hydroxide | 11.0 | 0 | 41 | 85.6 |
| 509 | 32 | 0.1 | Water/Methanol (90/10) | Sodium hydroxide | 11.0 | 0 | 48 | 85.6 |
| 510 | 33 | 0.3 | Water/Methanol (90/10) | Monoethanolamine | 12.0 | 0 | 39 | 85.6 |
| 511 | 34 | 0.3 | Water/Methanol (90/10) | Sodium hydroxide | 12.0 | 0 | 11 | 85.6 |
| 512 | 35 | 0.3 | Water/Methanol (90/10) | Sodium hydroxide | 11.0 | 0 | 16 | 85.6 |
| 513 | 36 | 0.3 | Water/Methanol (90/10) | Sodium hydroxide | 11.0 | 0 | 12 | 85.7 |
| 514 | 37 | 0.3 | Water/Methanol (80/20) | Sodium hydroxide | 12.5 | 0 | 11 | 85.6 |
| 515 | 38 | 0.3 | Water/Methanol (90/10) | Sodium hydroxide | 10.0 | 0 | 13 | 85.6 |
| 516 | 39 | 0.3 | Water/Methanol (90/10) | Ethylenediamine | 10.0 | 0 | 14 | 85.6 |
| 517 | 40 | 0.3 | Water/Methanol (90/10) | Potassium hydroxide | 10.0 | 0 | 12 | 85.6 |
| 518 | 41 | 0.3 | Water/Methanol (90/10) | Potassium hydroxide | 10.0 | 0 | 14 | 85.6 |
| 519 | 1 | 0.3 | Water/Methanol (90/10) | Sodium hydroxide | 10.0 | 2 | 150 | 85.6 |
| 520 | 6 | 0.3 | Water/Methanol (90/10) | Sodium hydroxide | 9.5 | 2 | 145 | 85.5 |
| 521 | 14 | 0.3 | Water/Methanol (90/10) | Sodium hydroxide | 9.5 | 3 | 158 | 85.5 |

Example 6 (Experiment Nos. 601 to 608)

In each experiment, polymerization was conducted using a stainless steel polymerization vessel with an inner capacity of 1,000 liters and having a stirrer, as described below.

The condensation product, the water-soluble polymeric compound (D), colloidal silica and/or alkali metal silicate (E), pH adjuster and solvent used in each experiment are given in Table 9. The other conditions of the coating liquids prepared are as given in Table 9. In each experiment, a coating liquid was applied to the inner wall, the stirring shaft, the stirring blades and other areas with which a monomer comes into contact of the polymerization vessel. The applied coating liquid was dried by heating at 40° C. for 15 minutes to form a coating, which was then washed with water.

Thereafter, in the polymerization vessel in which the coating was formed as above, polymerization was carried out in the same manner as in Example 1. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 100 times. After the 100th batch, the amount of polymer scale on an area located in the liquid during polymerization and on an area in the vicinity of the interface between the gas and liquid phases, was measured in the same manner as in Example 1.

The number of fish eyes which may appear on a formed sheet was measured in the same manner as in Example 1.

Further, to evaluate initial coloration in regard to a formed sheet, luminosity index L was measured in the same manner as in Example 1.

The results are given in Table 9.

TABLE 9

| Exp. No. | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Amount of polymer scale (g/m²) Liquid phase | Amount of polymer scale (g/m²) Around interface of gas-liquid phases | No. of fish-eye | L value |
|---|---|---|---|---|---|---|---|---|---|---|---|---|
| 601 | 1 | Gelatin | Colloidal silica I | 0.5 | 100:100:200 | Sadium hydroxide | 9.5 | Water/Methanol (80/20) | 0 | 7 | 6 | 72.5 |
| 602 | 5 | Polyacrylic acid | Colloidal silica I | 0.5 | 100:50:100 | Sadium hydroxide | 7.5 | Water/Methanol (80/20) | 0 | 10 | 7 | 72.5 |
| 603 | 6 | Polyacrylic acid | Colloidal silica III | 0.5 | 100:100:500 | Sadium hydroxide | 10.5 | Water/Methanol (80/20) | 0 | 9 | 7 | 72.5 |
| 604 | 7 | Carboxymethyl cellulose | Colloidal silica II | 0.5 | 100:200:100 | Sadium hydroxide | 10.0 | Water/Methanol (90/10) | 0 | 10 | 7 | 72.5 |
| 606 | 9 | Polyvinyl alcohol | Colloidal silica VI | 0.5 | 100:200:300 | Sadium hydroxide | 10.0 | Water/Methanol (90/10) | 0 | 8 | 6 | 72.5 |
| 607 | 30 | Polystyrene sulfonic acid | Colloidal silica VII | 0.5 | 100:50:200 | Sadium hydroxide | 11.0 | Water/Methanol (90/10) | 0 | 8 | 6 | 72.5 |
| 608 | 18 | Polyvinyl pyrrolidone | Colloidal silica IV | 0.5 | 100:50:200 | Sadium hydroxide | 11.0 | Water/Methanol (90/10) | 0 | 10 | 7 | 72.4 |

Example 7 (Experiment Nos. 701 to 721)

The polymerization batch as specified in Example 6 was repeated 150 times. Each polymerization batch was conducted in the same manner as in Example 6. After the 150th batch, the amount of polymer scale, the number of fish eyes in a formed sheet, and luminosity index L were measured in the same manner as in Example 1.

The results are given in Table 10.

TABLE 10

| Exp. No. | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Amount of polymer scale (g/m²) Liquid phase | Amount of polymer scale (g/m²) Around interface of gas-liquid phases | No. of fish-eye | L value |
|---|---|---|---|---|---|---|---|---|---|---|---|---|
| 701 | 1 | Gelatin | Colloidal silica I | 0.5 | 100:100:200 | Sadium hydroxide | 9.5 | Water/Methanol (80/20) | 0 | 73 | 34 | 72.4 |
| 702 | 6 | Polyacrylic acid | Colloidal silica I | 0.5 | 100:50:100 | Sadium hydroxide | 10.5 | Water/Methanol (80/20) | 0 | 82 | 35 | 72.4 |
| 703 | 18 | Polyvinyl pyrrolidone | Colloidal silica IV | 0.5 | 100:50:200 | Sadium hydroxide | 11.0 | Water/Methanol (90/10) | 0 | 86 | 35 | 72.4 |
| 704 | 24 | Geratin | Colloidal | 0.5 | 100:50:100 | Sadium | 9.5 | Water/ | 0 | 3 | 4 | 72.5 |

TABLE 10-continued

| | | Coating liquid | | | | | | | Polymerization result after the 150th batch | | | |
|---|---|---|---|---|---|---|---|---|---|---|---|---|
| | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Amount of polymer scale (g/m²) | | No. of fisheye | L value |
| Exp. No. | | | | | | | | | Liquid phase | Around interface of gas-liquid phases | | |
| | | | silica I | | | hydroxide | | Methanol (80/20) | | | | |
| 705 | 25 | Alginic acid | Colloidal silica III | 0.5 | 100:50:200 | Sadium hydroxide | 10.0 | Water/ Methanol (80/20) | 0 | 4 | 4 | 72.5 |
| 706 | 26 | Polyacrylamide | Colloidal silica III | 1.0 | 100:100:200 | Sadium hydroxide | 10.0 | Water/ Methanol (80/20) | 0 | 15 | 8 | 72.3 |
| 707 | 27 | Polystyrene | Colloidal silica III | 0.3 | 100:100:500 | Sadium hydroxide | 10.5 | Water/ Methanol (80/20) | 0 | 19 | 8 | 72.6 |
| 708 | 28 | Pectin | Colloidal silica II | 0.3 | 100:50:100 | Potassium hydroxide | 10.5 | Water/ Methanol (80/20) | 0 | 17 | 8 | 72.6 |
| 709 | 29 | Hydroxyethylcellullose | Colloidal silica IV | 0.3 | 100:50:200 | Potassium hydroxide | 11.0 | Water/ Methanol (90/10) | 0 | 18 | 8 | 72.5 |
| 710 | 30 | Polyvinyl alcohol | Colloidal silica V | 0.5 | 100:50:100 | Potassium hydroxide | 11.0 | Water/ Methanol (95/5) | 0 | 23 | 9 | 72.5 |
| 711 | 31 | Polyvinyl pyrrolidone | Sodium orthosilicate | 0.5 | 100:100:100 | Sadium hydroxide | 12.0 | Water/ Methanol (80/20) | 0 | 14 | 8 | 72.5 |
| 712 | 32 | Polyacrylic acid | Colloidal silica II | 0.5 | 100:100:200 | Ethylene diamine | 12.5 | Water/ Methanol (80/20) | 0 | 24 | 10 | 72.5 |
| 713 | 33 | Polystyrene sulfonic acid | Colloidal silica II | 0.5 | 100:200:100 | Monoethanolamine | 10.0 | Water/ Methanol (80/20) | 0 | 28 | 10 | 72.4 |
| 714 | 34 | Polyvinyl pyrrolidone | Colloidal silica III | 0.5 | 100:50:50 | Sadium hyroxide | 10.0 | Water/ Methanol (80/20) | 0 | 5 | 4 | 72.5 |
| 715 | 35 | Polyvinyl alcohol | Colloidal silica VI | 0.5 | 100:100:300 | Sadium hydroxide | 10.0 | Water/ Methanol (80/20) | 0 | 8 | 5 | 72.5 |
| 716 | 36 | Geratin | Colloidal silica VII | 0.5 | 100:200:300 | Sadium hydroxide | 10.0 | Water/ Methanol (90/10) | 0 | 9 | 5 | 72.5 |
| 717 | 37 | Hydroxyethyl cellullose | Colloidal silica I | 0.5 | 100:50:200 | Triethanolamine | 10.5 | Water/ Methanol (90/10) | 0 | 10 | 6 | 72.4 |
| 718 | 38 | Casein | Colloidal silica I | 0.5 | 100:50:100 | Sadium hydroxide | 10.5 | Water/ Methanol (90/10) | 0 | 5 | 4 | 72.4 |
| 719 | 39 | Polyacrylamide | Colloidal silica III | 0.5 | 100:200:200 | Sadium hydroxide | 11.0 | Water/ Methanol (90/10) | 0 | 7 | 5 | 72.4 |
| 720 | 40 | Polyvinyl pyrrolidone | Colloidal silica III | 0.5 | 100:100:200 | Sadium hydroxide | 11.0 | Water/ Methanol (90/10) | 0 | 5 | 5 | 72.5 |
| 721 | 41 | Geratin | Colloidal silica III | 0.5 | 100:100:200 | Sadium hydroxide | 11.0 | Water/ Methanol (90/10) | 0 | 8 | 6 | 72.5 |

Example 8 (Experiment Nos. 801 to 807)

In each experiment, polymerization was conducted using a stainless steel polymerization vessel with an inner capacity of 20 liters and having a stirrer, as described below.

The condensation product, the water-soluble polymeric compound (D), colloidal silica and/or alkali metal silicate (E), pH adjuster and solvent used in each experiment are given in Table 11. The other conditions of the coating liquids prepared are as given in Table 11. In each experiment, a coating liquid was applied to the inner wall, the stirring shaft, the stirring blades and other areas with which a monomer comes into contact of the polymerization vessel and dried to form a coating, which was then washed with water in the same manner as in Example 6.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

The batch comprising the operations from forming a coating through polymerizing to washing with water was repeated 50 times. After the 50th batch, the amount of polymer scale on an area located in the liquid during polymerization and on an area in the vicinity of the interface between the gas and liquid phases, was measured in the same manner as in Example 1.

Further, to evaluate initial coloration at the time a polymer is formed into sheet, luminosity index L was measured in the same manner as in Example 3.

The results are given in Table 11.

TABLE 11

| Exp. No. | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Polymerization result after the 50th batch Amount of polymer scale (g/m²) Liquid phase | Around interface of gas-liquid phases | L value |
|---|---|---|---|---|---|---|---|---|---|---|---|
| 801 | 1 | Polyacrylamide | Colloidal silica I | 0.5 | 100:100:200 | Sadium hydroxide | 9.5 | Water/Methanol (90/10) | 0 | 11 | 85.7 |
| 802 | 5 | Polyacrylic acid | Colloidal silica II | 0.5 | 100:100:200 | Sadium hydroxide | 9.5 | Water/Methanol (90/10) | 0 | 12 | 85.7 |
| 803 | 6 | Polystyrenesulfonic acid | Colloidal silica III | 0.5 | 100:50:50 | Sadium hydroxide | 9.5 | Water/Methanol (90/10) | 0 | 16 | 85.6 |
| 804 | 7 | Polyvinyl alcohol | Colloidal silica VI | 0.5 | 100:50:100 | Sadium hydroxide | 9.5 | Water/Methanol (90/10) | 0 | 14 | 85.7 |
| 805 | 9 | Hydroxyethyl celullose | Collodial silica VII | 0.5 | 100:50:200 | Sadium hydroxide | 9.0 | Water/Methanol (95/5) | 0 | 13 | 85.6 |
| 806 | 30 | Alginic acid | Colloidal silica I | 0.5 | 100:100:500 | Sadium hydroxide | 9.0 | Water/Methanol (95/5) | 0 | 17 | 85.6 |
| 807 | 18 | Polyvinyl pyrrolidone | Collidal silica I | 0.5 | 100:50:250 | Sadium hydroxide | 9.0 | Water/Methanol (95/5) | 0 | 12 | 85.6 |

Example 9 (Experiment Nos. 901 to 921)

The polymerization batch as specified in Example 8 was repeated 80 times. Each polymerization batch was conducted in the same manner as in Example 8. After the 80th batch, the amount of polymer scale, the number of fish eyes in a formed sheet, and luminosity index L were measured in the same manner as in Example 8.

The results are given in Table 12.

TABLE 12

| Exp. No. | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Polymerization result after the 80th batch Amount of polymer scale (g/m²) Liquid phase | Around interface of gas-liquid phases | L value |
|---|---|---|---|---|---|---|---|---|---|---|---|
| 901 | 1 | Polyacrylamide | Colloidal silica I | 0.5 | 100:100:200 | Sadium hydroxide | 9.5 | Water/Methanol (90/10) | 0 | 77 | 85.5 |
| 902 | 6 | Polyacrylic acid | Colloidal silica II | 0.5 | 100:100:200 | Sadium hydroxide | 9.5 | Water/Methanol (90/10) | 0 | 85 | 85.6 |
| 903 | 18 | Polyvinyl pyrrolidone | Colloidal silica I | 0.5 | 100:50:250 | Sadium hydroxide | 9.0 | Water/Methanol (95/5) | 0 | 82 | 85.5 |
| 904 | 24 | Polyacrylic acid | Collidal silica I | 0.5 | 100:100:200 | Sadium hydroxide | 9.5 | Water/Methanol (90/10) | 0 | 5 | 85.7 |
| 905 | 25 | Polyacrylic acid | Colloidal silica III | 1.0 | 100:100:200 | Sadium hydroxide | 9.5 | Water/Methanol (90/10) | 0 | 7 | 85.7 |
| 906 | 26 | Polyacrylic acid | Colloidal silica II | 0.5 | 100:50:100 | Sadium hydroxide | 10.0 | Water/Methanol (90/10) | 0 | 16 | 85.7 |

TABLE 12-continued

| Exp. No. | (a) Condensation product No. | (D) Water-soluble polymeric compound | (E) Colloidal silica or alkali metal silicate salt | (a) + (D) + (E) Total concentration (%) | (a):(D):(E) (wt. ratio) | pH adjuster | pH | Solvent (Wt. ratio) | Amount of polymer scale (g/m²) Liquid phase | Around interface of gas-liquid phases | L value |
|---|---|---|---|---|---|---|---|---|---|---|---|
| 907 | 27 | Polyvinyl alcohol | Colloidal silica VI | 1.5 | 100:50:100 | Sadium hydroxide | 10.0 | Water/Methanol (90/10) | 0 | 19 | 85.4 |
| 908 | 28 | Polyvinyl alcohol | Colloidal silica VII | 0.5 | 100:200:300 | Potassium hydroxide | 10.5 | Water/Methanol (90/10) | 0 | 16 | 85.6 |
| 909 | 29 | Polyvinyl alcohol | Colloidal silica V | 0.3 | 100:50:100 | Potassium hydroxide | 10.5 | Water/Methanol (80/20) | 0 | 16 | 85.7 |
| 910 | 30 | Polyvinyl alcohol | Sosium metasilicate | 0.5 | 100:200:250 | Potassium hydroxide | 10.5 | Water/Methanol (80/20) | 0 | 25 | 85.5 |
| 911 | 31 | Polyvinyl pyrrolidone | Colloidal silica I | 0.5 | 100:100:100 | Potassium hydroxide | 9.0 | Water/Methanol (80/20) | 0 | 17 | 85.5 |
| 912 | 32 | Polyvinyl pyrrolidone | Colloidal silica IV | 0.5 | 100:50:100 | Monoethanolamine | 9.0 | Water/Methanol (80/20) | 0 | 15 | 85.6 |
| 913 | 33 | Polyvinyl pyrrolidone | Colloidal silica I | 0.5 | 100:30:100 | Sadium hydroxide | 9.0 | Water/Methanol (95/5) | 0 | 18 | 85.6 |
| 914 | 34 | Polyacrylamide | Colloidal silica III | 0.5 | 100:50:50 | Potassium hydroxide | 9.0 | Water/Methanol (95/5) | 0 | 7 | 85.6 |
| 915 | 35 | Polyacrylamide | Colloidal silica III | 0.5 | 100:200:200 | Triethanolamine | 9.0 | Water/Methanol (95/5) | 0 | 6 | 85.6 |
| 916 | 36 | Polyacrylamide | Colloidal silica III | 0.5 | 100:30:100 | Sadium hydroxide | 9.0 | Water/Methanol (95/5) | 0 | 8 | 85.5 |
| 917 | 37 | Hydroxyethylcelullose | Colloidal silica III | 0.5 | 100:100:100 | Potassium hydroxide | 9.5 | Water/Methanol (95/5) | 0 | 7 | 85.6 |
| 918 | 38 | Hydroxyethylcelullose | Colloidal silica II | 0.5 | 100:100:100 | Potassium hydroxide | 9.5 | Water/Methanol (90/10) | 0 | 7 | 85.5 |
| 919 | 39 | Hydroxyethylcelullose | Colloidal silica VI | 0.5 | 100:50:50 | Ethylenediamine | 11.0 | Water/Methanol (90/10) | 0 | 8 | 85.6 |
| 920 | 40 | Pectin | Colloidal silica VII | 0.5 | 100:50:250 | Sadium hydroxide | 12.0 | Water/Methanol (90/10) | 0 | 12 | 85.5 |
| 921 | 41 | Geratin | Colloidal silica I | 0.5 | 100:100:100 | Sadium hydroxide | 12.0 | Water/Methanol (90/10) | 0 | 9 | 85.5 |

The particle diameter of the colloidal silicas used in Examples 6 to 9 are given in Table 13.

TABLE 13

| Colloidal silicas | | |
|---|---|---|
| No. | Diameter of colloid particles | Remarks |
| I | 5–7 μm | Snowtex CXS-9* |
| II | 7–9 μm | Snowtex S* |
| III | 10–20 μm | Snowtex O* |
| IV | 10–20 μm | Methanol silica sol |
| V | 10–20 μm | Ethylene glycol silica sol |
| VI | 10–20 μm | Snowtex N* |
| VII | 10–20 μm | Snowtex C* |

Note:
All of the colloidal silicas above were produced by Nissan Chemical Industries, Ltd.
*tradenames Example 10

In each experiment, polymerization was conducted using a stainless steel polymerization vessel with an inner capacity of 1,000 liters and having a stirrer, as described below.

The coating liquid used in Experiment No. 801 was applied to the inner wall, the stirring shaft, the stirring blades and other areas with which a monomer comes into contact of the polymerization vessel. The applied coating liquid was dried by heating at 50° C. for 10 minutes to form a coating, which was then washed with water.

Thereafter, in the polymerization vessel in which the coating was formed as above, 400 kg of water, 260 kg of styrene, 140 kg of acrylonitrile, 400 g of a partially saponified product of a polyacryamide and 1.2 kg of α,α'-azobisisobutyronitrile were charged, and polymerization was carried out at 90° C. for 5 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, amount of polymer scale was measured in the same manner as in Example 1. Specifically, the amount of polymer scale on an area located in the liquid during polymerization was measured to be 0 g/m², and the amount of polymer scale on an area in the vicinity of the interface between the gas and liquid phases was measured to be 19 g/m².

Example 11

In each experiment, polymerization was conducted using a stainless steel polymerization vessel with an inner capacity of 20 liters and having a stirrer, as described below.

The coating liquid used in Experiment No. 801 was applied to the inner wall, the stirring shaft, the stirring blades and other areas with which a monomer comes into contact of the polymerization vessel. The applied coating liquid was dried by heating at 50° C. for 10 minutes to form a coating, which was then washed with water.

Thereafter, into the polymerization vessel in which the coating was formed as above, 9.5 kg of water, 240 g of sodium dodecylbenzenesulfonate, 15 g of t-dodecyl mercaptan, 2.1 kg of butadiene, 2.8 g of methyl methacrylate, 320 g of styrene and 16 g of potassium persulfate were charged. Polymerization was then carried out at 60° C. for 10 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 50 times. After the 50th batch, amount of polymer scale was measured in the same manner as in Example 1. Specifically, the amount of polymer scale on an area located in the liquid during polymerization was measured to be 0 g/m², and the amount of polymer scale on an area in the vicinity of the interface between the gas and liquid phases was measured to be 23 g/m².

Example 12

In each experiment, polymerization was conducted using a stainless steel polymerization vessel with an inner capacity of 100 liters and having a stirrer, as described below.

The coating liquid used in Experiment No. 902 was applied to the inner wall, the stirring shaft, the stirring blades and other areas with which a monomer comes into contact of the polymerization vessel. The-applied coating liquid was dried by heating at 50° C. for 15 minutes to form a coating, which was then washed with water.

Thereafter, in the polymerization vessel in which the coating was formed as above, 40 kg of water, 500 g of a disproportionated potassium rhodinate, 13 kg of a polybutadiene latex (solid content: 45%), 9 kg of styrene monomer, 5 kg of acrylonitrile monomer, 40 g of t-dodecyl mercaptan, and 140 g of cumene hydroperoxide were charged. Thereafter, when the internal temperature became 47° C., 200 g of dextrose, 2 g of ferrous sulfate and 100 g of sodium pyrophosphate were charged in the vessel, followed by polymerization at 65° C. for 4 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m², and the amount of polymer scale on an area in the vicinity of the interface between the gas and liquid phases was measured to be 15 g/m².

Example 13

In each experiment, polymerization was conducted using a stainless steel polymerization vessel with an inner capacity of 20 liters and having a stirrer, as described below.

The coating liquid used in Experiment No. 913 was applied to the inner wall, the stirring shaft, the stirring blades and other areas with which a monomer comes into contact of the polymerization vessel. The applied coating liquid was dried by heating at 50° C. for 15 minutes to form a coating, which was then washed with water.

Thereafter, in the polymerization vessel in which the coating was formed as above, 4.0 kg of water and 6 g of sodium dodecylbenzenesulfonate were added, and they were heated to 60° C. under stirring. The air inside the polymerization vessel was replaced with a nitrogen gas, and thereafter 94 g of n-butyl acrylate, 220 g of methyl methacrylate, 5 g of acrylic acid and 5 g of methacrylic acid were added thereto. Subsequently, after 1 g of ammonium persulfate and 1 g of sodium hydrosulfite were added, stirring was continued for 20 minutes. Subsequently, a monomeric mixture containing 2.1 kg of n-butyl acrylate, 4.8 kg of methyl methacrylate, 100 g of acrylic acid and 100 g of methacrylic acid, 500 g of 1% by weight aqueous ammonium persulfate solution, 500 g of 1% by weight aqueous sodium hydrosulfite solution and 2.0 kg of 25% by weight polyoxyethylene nonylphenyl ether solution were added uniformly to the reaction mixture over 3 hours. After the addition, the reaction mixture was heated to 70° C. and polymerization was carried out for 2 hours. After the completion of the polymerization, the produced polymer was taken out and the unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$ and the amount of polymer scale on an area in the vicinity of the interface between the gas and liquid phases was measured to be 32 g/m$^2$.

Example 14

In each experiment, polymerization was conducted using a stainless steel polymerization vessel with an inner capacity of 20 liters and having a stirrer, as described below.

The coating liquid used in Experiment No. 913 was applied to the inner wall, the stirring shaft, the stirring blades and other areas with which a monomer comes into contact of the polymerization vessel. The applied coating liquid was dried by heating at 50° C. for 10 minutes to form a coating, which was then washed with water.

Thereafter, in the polymerization vessel in which the coating was formed as above, 45 kg of water, 312 g of a completely saponified polyvinyl alcohol, and 6 g of sodium carbonate were charged. Subsequently, the mixture was heated to 65° C. under stirring. After 550 g of vinyl acetate and 550 g of 1% by weight aqueous ammonium persulfate solution were added thereto, the mixture was heated to 80° C. Subsequently, 5.0 kg of vinyl acetate and 1.0 kg of 1% by weight aqueous ammonium persulfate were added thereto uniformly over 4 hours. After the addition of the vinyl acetate and ammonium persulfate, the reaction mixture was heated to 90° C. and polymerization was carried out at 90° C. for 2 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$ and the amount of polymer scale on an area in the vicinity of the interface between the gas and liquid phases was measured to be 22 g/m$^2$.

Example 15

In each experiment, polymerization was conducted using a stainless steel polymerization vessel with an inner capacity of 20 liters and having a stirrer, as described below.

The coating liquid used in Experiment No. 914 was applied to the inner wall, the stirring shaft, the stirring blades and other areas with which a monomer comes into contact of the polymerization vessel. The applied coating liquid was dried by heating at 50° C. for 20 minutes to form a coating, which was then washed with water.

Thereafter, in the polymerization vessel in which the coating was formed as above, 7.0 kg of water, 430 g of a partially saponified polyvinyl alcohol, 7 g of sodium pyrophosphate and 7 g of sodium hydrosulfite were added, and they were heated to 50° C. After the air inside the polymerization vessel was replaced with a nitrogen gas, the reaction mixture was heated to 70° C. Thereafter, ethylene was charged into the vessel until the internal pressure became 14 kg/cm$^2$·G. Subsequently, 6.0 kg of vinyl acetate and 1.0 kg of 2% by weight aqueous ammonium persulfate solution were added uniformly over 4 hours. After the addition of the vinyl acetate and ammonium persulfate, the reaction mixture was heated to 80° C. and polymerization was carried out for 3 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$, and amount of polymer scale on an area in the vicinity of the interface between the gas and liquid phases was measured to be 7 g/m$^2$.

Example 16

In each experiment, polymerization was conducted using a stainless steel polymerization vessel with an inner capacity of 20 liters and having a stirrer, as described below.

The coating liquid used in Experiment No. 914 was applied to the inner wall, the stirring shaft, the stirring blades and other areas with which a monomer comes into contact of the polymerization vessel. The applied coating liquid was dried by heating at 50° C. for 20 minutes to form a coating, which was then washed with water.

Thereafter, in the polymerization vessel in which the coating was formed as above, an aqueous solution containing 1.2 kg of a polyvinyl alcohol with a saponification degree of 99.4 mole % and a polymerization degree of 2,250 in 15 liters of water was charged. To the aqueous solution under stirring, 1 kg of 35% concentrated hydrochloric acid was added. Ten minutes after the addition of the concentrated hydrochloric acid, 800 g of butyraldehyde was added dropwise thereto over 15 minutes. Thereafter, the reaction mixture was heated to 60° C. at which reaction was carried out for 3 hours. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m$^2$ and the amount of polymer scale on an area in the vicinity of the interface between the gas and liquid phases was measured to be 32 g/m².

Example 17

1) Preparation of prepolymer

A prepolymer for use in this example was prepared as below.

A polymerization was charged with 6,000 g of styrene monomer, 720 g of a polybutadiene rubber, 480 g of a mineral oil (tradename: CP-50, product of Idemitsu Kosan K.K.) and 6,000 g of n-dodecyl mercaptan, and they were allowed to react at 115° C. for 5 hours to produce a prepolymer.

2) Polymerization

Polymerization was conducted using a stainless steel polymerization vessel with an inner capacity of 20 liters and having a stirrer, as described below.

The coating liquid used in Experiment No. 914 was applied to the inner wall, the stirring shaft, the stirring blades and other areas with which a monomer comes into contact of the polymerization vessel. The applied coating liquid was dried by heating at 60° C. for 10 minutes to form a coating, which was then washed with water.

Thereafter, in the polymerization vessel in which the coating was formed as above, 7,000 g of water, 7,000 g of the prepolymer prepared above, 70 g of hydroxyapatite, 0.14 g of sodium dodecylbenzenesulfonate, 17.5 g of benzoyl peroxide and 10.5 g of t-butyl perbenzoate were charged. Subsequently, reaction was carried out at 92° C. for 3.5 hours, and then reaction was carried out at 135° C. for 1 hour, to produce a polymer. After the completion of the polymerization, the produced polymer was taken out and unreacted monomer was recovered out of the polymerization vessel. Subsequently, the inside of the polymerization vessel was washed with water and residual resin was removed.

The batch above comprising the operations from forming a coating through polymerizing to washing with water was repeated 80 times. After the 80th batch, amount of polymer scale was measured in the same manner as in Example 1. Specifically, the amount of polymer scale on an area located in the liquid during polymerization was measured to be 0 g/m² and the amount of polymer scale on an area in the vicinity of the interface between the gas and liquid phases was measured to be 32 g/m².

We claim:

1. A polymer scale preventive agent for use in polymerization of a monomer having an ethylenically unsaturated double-bond, comprising a condensation product of:
   (A) an aromatic amine compound, and
   (B) a condensation product of an aromatic hydroxyl compound with a compound selected from the group consisting of said aromatic hydroxyl compound, acetone, aldehydes and aromatic amine compounds, wherein said condensation product of components (A) and (B) is dissolved or dispersed in a solvent to form a liquid state: and
   one or both of:
   (D) a water-soluble polymeric compound: and
   (E) at least one compound selected from the group consisting of a colloidal silica and an alkali metal silicate.

2. The polymer scale preventive agent according to claim 1, wherein the component (A) comprises at least one compound selected from the compounds represented by the general formulas (1), (2) and (3):

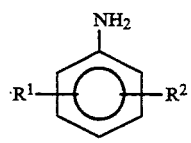
(1)

wherein $R^1$ stands for —H, —NH₂, —Cl, —OH, —NO₂, —COCH₃, OCH₃, —N(CH₃)₂ or an alkyl group having 1 to 3 carbon atoms, and $R^2$ stands for —H, —NH₂, —OH, —CH₃, —COOH or SO₃H;

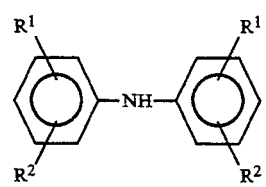
(2)

wherein the two $R^1$ may be the same or different and are each as defined above, and the two $R^2$ may be the same or different and are each as defined above; and

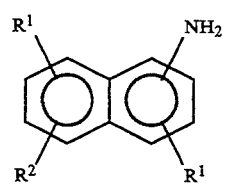
(3)

wherein the two $R^1$ may be the same or different and are each as defined above, and $R^2$ is as defined above.

3. The polymer scale preventive agent according to claim 1, wherein the aromatic hydroxyl compound comprises an least one compound selected from the compounds represented by the formulas (4) and (5):

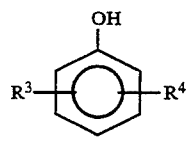
(4)

wherein $R^3$ stands for —H, —Cl, —OH, —COCH₃, —OCH₃, —COOH, —SO₃H or an alkyl group having 1 to 3 carbon atoms, and $R^4$ stands for —H, —Cl, —OH, —OCH₃, —OC₂H₅ or —COOH; and

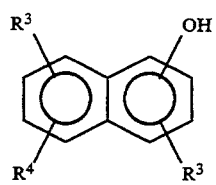
(5)

wherein the two $R^3$ may be the same or different and are each as defined above, and $R^4$ is as defined above.

4. The polymer scale preventive agent according to claim 1, wherein the component (B) comprises a natural aromatic hydroxyl-containing organic compound.

5. The polymer scale preventive agent according to claim 1, wherein the condensation product of the components (A) and (B) is produced by the condensation reaction of the component (A) and the component (B) in an amount of 0.5 to 10.0 parts by weight per part by weight of the component (A).

6. The polymer scale preventive agent according to claim 1, wherein the condensation product of the components (A) and (B) is obtained by a process in which the condensation reaction of the component (A) alone is first carried out and thereafter the component (B) begins to be added to the reaction mixture.

7. The polymer scale preventive agent according to claim 6, wherein the component (B) begins to be added to the reaction mixture when the condensation conversion of the component (A) reaches in the range of 50 to 99% by weight.

8. The polymer scale preventive agent according to claim 1, wherein the concentration of the condensation product of the components (A) and (B) is in the range from 0.001 to 15% by weight.

9. The polymer scale preventive agent according to claim 11, wherein the component (D) is present in an amount of 0.01 to 10 parts by weight and the component (E) is present in an amount of 0.01 to 20 parts by weight per part by weight of the condensation product of the components (A) and (B).

* * * * *